United States Patent
White, III et al.

(10) Patent No.: US 12,000,288 B2
(45) Date of Patent: Jun. 4, 2024

(54) VARIABLE THICKNESS MACHINABLE COATING FOR PLATFORM SEALS

(71) Applicant: Raytheon Technologies Corporation, Farmington, CT (US)

(72) Inventors: Robert A. White, III, Meriden, CT (US); Bryan P. Dube, Columbia, CT (US); Wojciech Lipka, Cromwell, CT (US)

(73) Assignee: RTX CORPORATION, Farmington, CT (US)

( * ) Notice: Subject to any disclaimer, the term of this patent is extended or adjusted under 35 U.S.C. 154(b) by 32 days.

(21) Appl. No.: 17/246,912

(22) Filed: May 3, 2021

(65) Prior Publication Data

US 2022/0349314 A1 Nov. 3, 2022

(51) Int. Cl.
*F01D 5/00* (2006.01)
*F01D 11/00* (2006.01)
*F01D 25/00* (2006.01)
*F01D 25/24* (2006.01)

(52) U.S. Cl.
CPC .......... *F01D 11/005* (2013.01); *F01D 11/003* (2013.01); *F01D 25/005* (2013.01); *F01D 25/246* (2013.01); *F05D 2230/90* (2013.01); *F05D 2240/11* (2013.01)

(58) Field of Classification Search
CPC ...... F01D 11/003; F01D 11/005; F01D 5/288; F01D 5/286; F05D 2230/90; F05D 2240/11; F05D 2300/611
See application file for complete search history.

(56) References Cited

U.S. PATENT DOCUMENTS

| | | | |
|---|---|---|---|
| 6,830,427 B2 * | 12/2004 | Lafarge | F01D 5/187 415/115 |
| 9,719,371 B2 * | 8/2017 | Hannam | F01D 25/08 |
| 9,759,079 B2 * | 9/2017 | Sippel | F01D 25/265 |
| 10,100,656 B2 * | 10/2018 | Bancheri | F16J 15/0887 |
| 10,934,873 B2 | 3/2021 | Sarawate et al. | |
| 2006/0110254 A1 * | 5/2006 | Itzel | C23C 28/3455 416/193 A |
| 2016/0177754 A1 * | 6/2016 | Robertson | F01D 5/12 416/214 A |
| 2017/0058686 A1 | 3/2017 | Bancheri et al. | |

(Continued)

FOREIGN PATENT DOCUMENTS

WO 2011047693 4/2011

OTHER PUBLICATIONS

European Search Report for European Patent Application No. 22170329.1 dated Sep. 26, 2022.

*Primary Examiner* — Brian P Wolcott
*Assistant Examiner* — Maxime M Adjagbe
(74) *Attorney, Agent, or Firm* — Carlson, Gaskey & Olds, P.C.

(57) ABSTRACT

A flow path component assembly includes a flow path component that has a platform that extends from a first circumferential side to a second circumferential side. The platform has a first radius of curvature between the first circumferential side and the second circumferential side. A coating is arranged on a portion of the platform near the first circumferential side. The coating has a second radius of curvature. The second radius of curvature is larger than the first radius of curvature.

20 Claims, 5 Drawing Sheets

(56) References Cited

U.S. PATENT DOCUMENTS

| | | |
|---|---|---|
| 2018/0045072 A1 | 2/2018 | Hannam et al. |
| 2019/0186280 A1* | 6/2019 | Clayton ................ F01D 11/003 |
| 2020/0141276 A1 | 5/2020 | Wolfe et al. |
| 2020/0355089 A1* | 11/2020 | Razzell .................. F01D 11/08 |

* cited by examiner

VARIABLE THICKNESS MACHINABLE COATING FOR PLATFORM SEALS

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor or turbine sections may include vanes mounted on vane platforms. Seals may be arranged between matefaces of adjacent components to reduce leakage to the high pressure and high temperature gas flow.

SUMMARY OF THE INVENTION

In one exemplary embodiment, a flow path component assembly includes a flow path component that has a platform that extends from a first circumferential side to a second circumferential side. The platform has a first radius of curvature between the first circumferential side and the second circumferential side. A coating is arranged on a portion of the platform near the first circumferential side. The coating has a second radius of curvature. The second radius of curvature is larger than the first radius of curvature.

In another embodiment according to any of the previous embodiments, the coating has a first thickness and a second thickness. The second thickness is closest to the first circumferential side. The second thickness is smaller than the first thickness.

In another embodiment according to any of the previous embodiments, the coating has a thickness less than about 0.100 inches (2.54 mm).

In another embodiment according to any of the previous embodiments, the platform extends from a first axial side to a second axial side. The coating extends from the first axial side to the second axial side.

In another embodiment according to any of the previous embodiments, the coating has a portion between the first and second axial sides that is substantially flat in an axial direction.

In another embodiment according to any of the previous embodiments, the portion extends between 25% and 70% of a distance between the first axial side and the second axial side.

In another embodiment according to any of the previous embodiments, the coating has a first thickness in the portion that is smaller than an outer thickness forward or aft of the portion.

In another embodiment according to any of the previous embodiments, the coating extends a circumferential distance from the first circumferential side of less than about 0.250 inches (6.35 mm).

In another embodiment according to any of the previous embodiments, the platform has a radially inner surface and a radially outer surface. The coating is on the radially outer surface.

In another embodiment according to any of the previous embodiments, the coating is configured to engage with a mateface seal.

In another embodiment according to any of the previous embodiments, the platform is formed from a ceramic matrix composite material.

In another embodiment according to any of the previous embodiments, the platform is a vane platform.

In another embodiment according to any of the previous embodiments, the vane platform is an outer vane platform.

In another exemplary embodiment, a turbine section for a gas turbine engine includes a plurality of vanes arranged circumferentially about an engine axis. Each vane has a platform. Each of the platforms has a first radial side and a second radial side and extends from a first circumferential side to a second circumferential side. A coating is arranged on the first radial side along the first circumferential side and the second circumferential side. The coating has a first thickness and a second thickness that is different from the first thickness. A mateface seal arranged on the coating near the first circumferential side of a first platform and a second circumferential side of a second platform.

In another embodiment according to any of the previous embodiments, the platform extends from a first axial side to a second axial side. The coating extends from the first axial side to the second axial side. The coating has a portion between the first and second axial sides that is substantially flat in an axial direction. The portion extends between 25% and 70% of a distance between the first axial side and the second axial side.

In another embodiment according to any of the previous embodiments, the platform has a first radius of curvature in a circumferential direction. The coating has a second radius of curvature in the circumferential direction. The second radius of curvature larger than the first radius of curvature In another embodiment according to any of the previous embodiments, an axial seal extends along an axial side of the platform. A step is formed in the coating. At least a portion of the axial seal is arranged between the step and the mateface seal.

In another embodiment according to any of the previous embodiments, a spring assembly biases the mateface seal into engagement with the coating.

In another embodiment according to any of the previous embodiments, the mateface seal is a metallic material.

In another embodiment according to any of the previous embodiments, at least one of the platforms is formed from a ceramic material.

The present disclosure may include any one or more of the individual features disclosed above and/or below alone or in any combination thereof.

DETAILED DESCRIPTION

Figure 1:
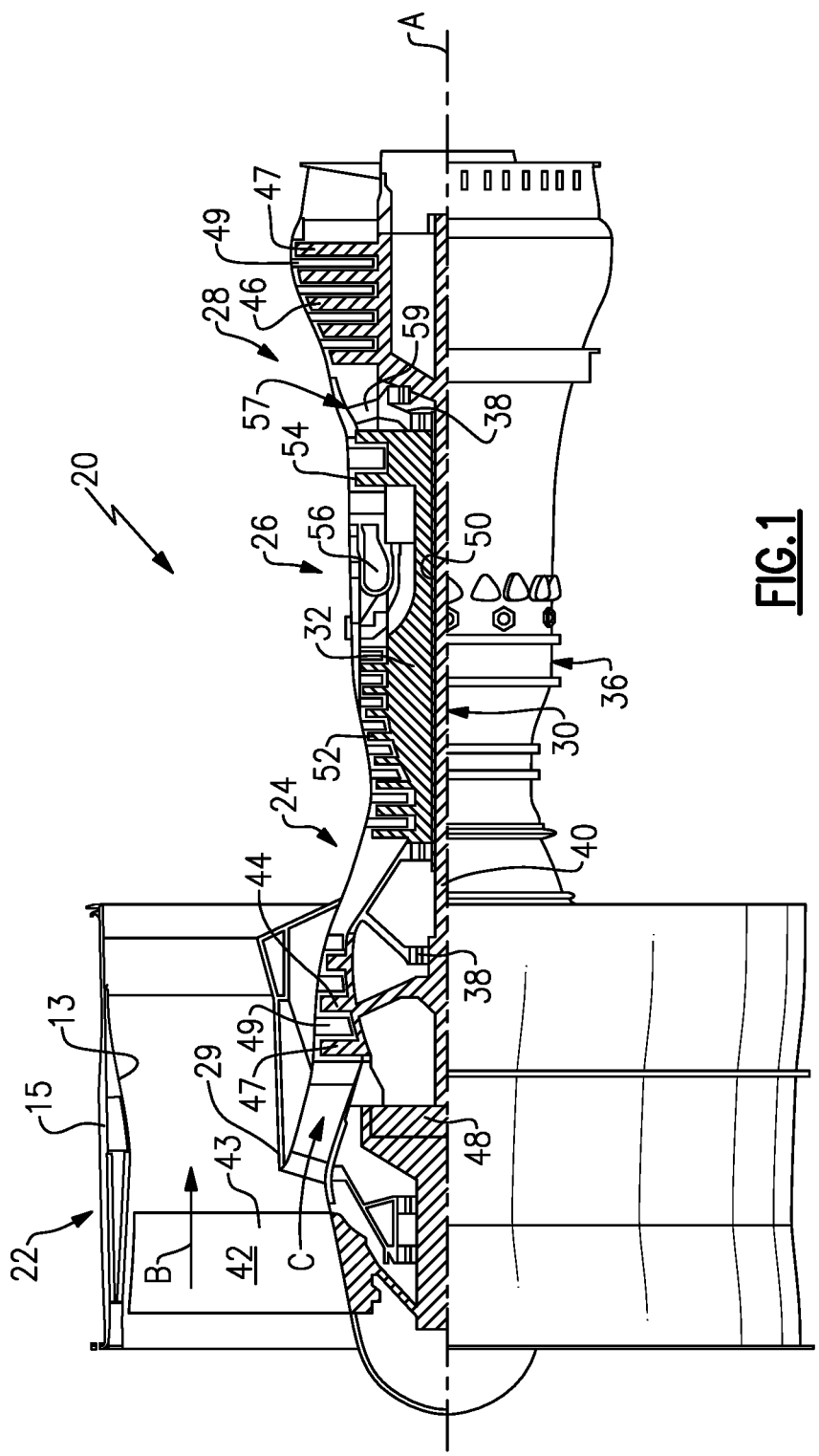
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

Figure 2:
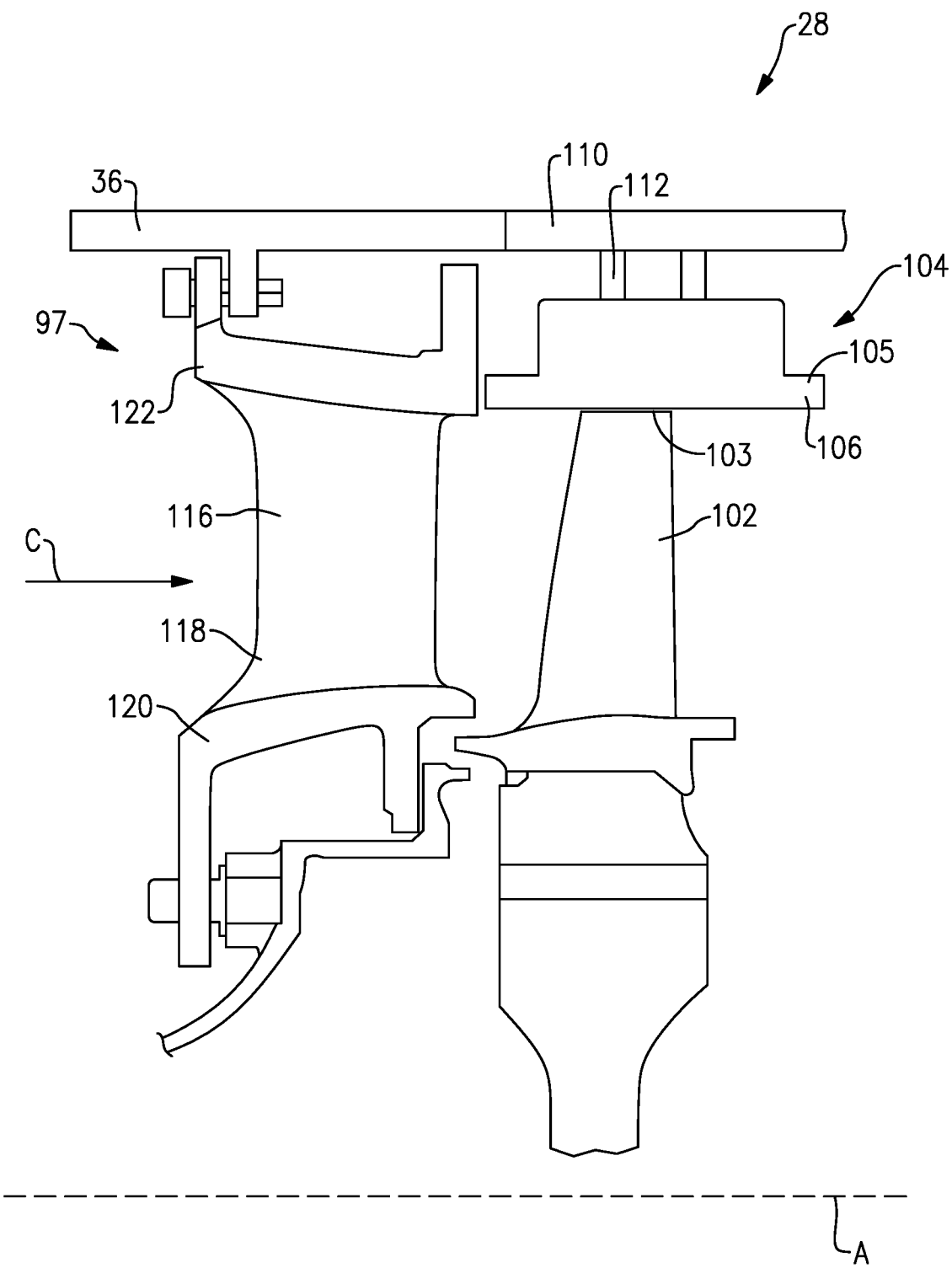
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be mounted to an engine case or structure, such as engine static structure 36 via a control ring or support structure 110 and a carrier 112. The engine structure 36 may extend for a full 360° about the engine axis A.

The turbine vane assembly 97 generally comprises a plurality of vane segments 118. In this example, each of the vane segments 118 has an airfoil 116 extending between an inner vane platform 120 and an outer vane platform 122.

Figure 3:
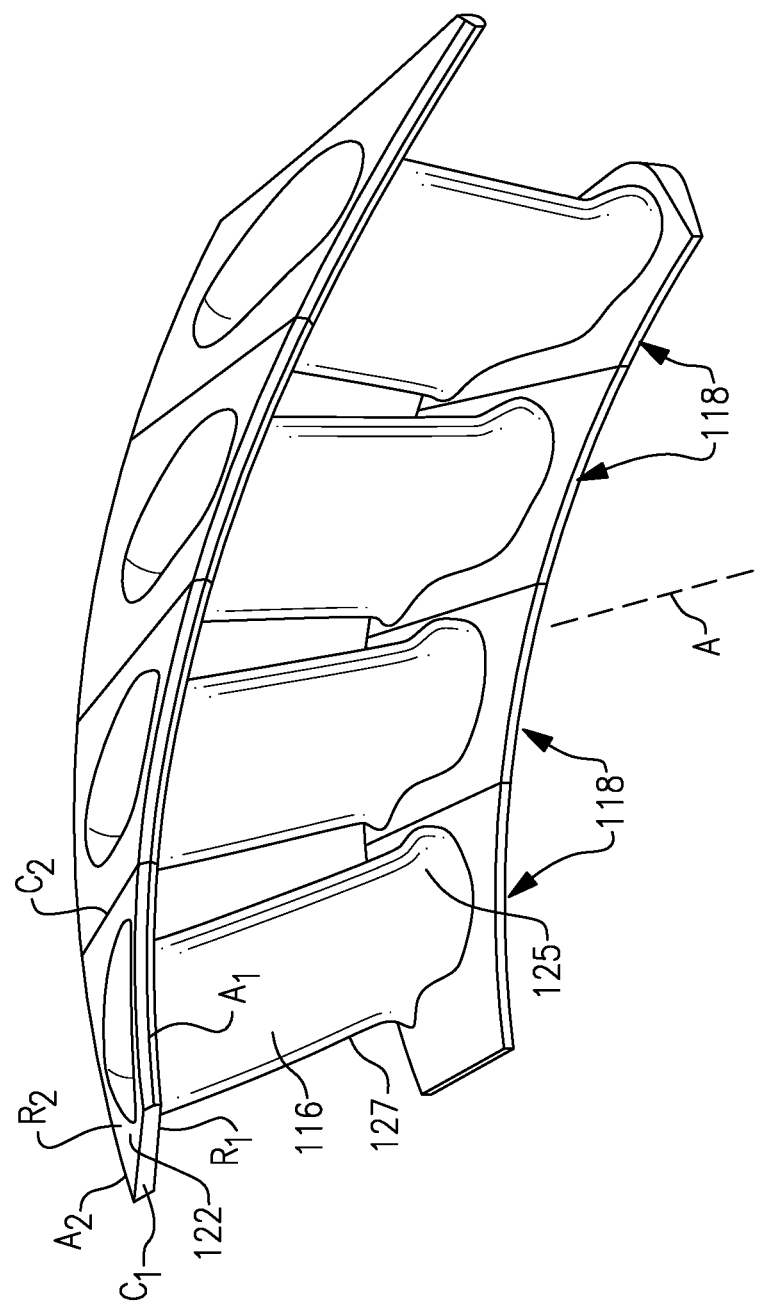
FIG. 3 schematically illustrates a portion of a vane ring assembly.

FIG. 3 illustrates a portion of the vane ring assembly 97 from the turbine section 28 of the engine 20. The vane ring assembly 97 is made up of a plurality of vanes 118 situated in a circumferential row about the engine central axis A. Although the vane segments 118 are shown and described with reference to application in the turbine section 28, it is to be understood that the examples herein are also applicable to structural vanes in other sections of the engine 20.

The vane segment 118 has an outer platform 122 radially outward of the airfoil 116. Each platform 122 has radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the outer vane platform 122 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end). In other words, the first axial side A1 is near the airfoil leading end 125 and the second axial side A2 is near the airfoil trailing end 127. The first and second circumferential sides C1, C2 of each platform 122 abut circumferential sides C1, C2 of adjacent platforms 122. In this example, a mateface seal is arranged between circumferential sides C1, C2 of adjacent platforms, as will be described further herein.

Although a vane platform 122 is described, this disclosure may apply to other components, and particularly flow path components. For example, this disclosure may apply to combustor liner panels, shrouds, transition ducts, exhaust nozzle liners, blade outer air seals, or other CMC components. Further, although the outer vane platform 122 is generally shown and referenced, this disclosure may apply to the inner vane platform 120.

The vane platform 122 may be formed of a ceramic material, such as a ceramic matrix composite ("CMC") material or a monolithic ceramic. In one example, each platform 122 is formed of a plurality of CMC laminate sheets. The laminate sheets may be silicon carbide fibers, formed into a braided or woven fabric in each layer. In other examples, the vane platform 122 may be made of a monolithic ceramic. CMC components such as vane platforms 120 are formed by laying fiber material, such as laminate sheets or braids, in tooling, injecting a gaseous or melt infiltrant into the tooling, and reacting to form a solid composite component. The component may be further processed by adding additional material to coat the laminate sheets. CMC components may have higher operating temperatures than components formed from other materials.

Figure 4:
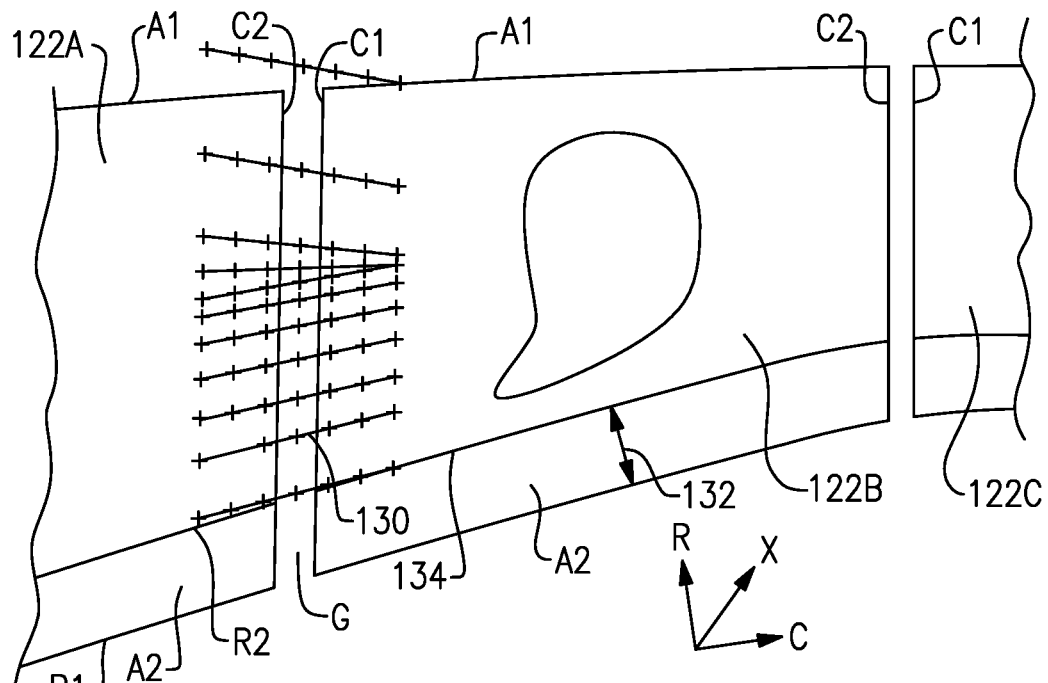
FIG. 4 schematically illustrates a view of a portion of an exemplary vane platform assembly.

FIG. 4 illustrates a view of a portion of a platform assembly from an aft side looking forward towards the first axial side A1. In the vane ring assembly 97, a plurality of platforms 122A, 122B, 122C are arranged circumferentially adjacent one another. Each of the platforms 122A, 122B, 122C has first and second circumferential sides C1, C2 arranged adjacent circumferential sides C1, C2 of an adjacent segment. For example, the first circumferential side C1 of the platform 122B is adjacent the second circumferential side C2 of the platform 122A and the second circumferential side C2 of the platform 122B is adjacent the first circumferential side C1 of the platform 122C. In some examples, a gap G is formed between the first and second platforms 122A, 122B in the circumferential direction C. Each platform may have a uniform thickness 132 in a radial direction, for example. The platforms 122A, 122B, 122C have an outer surface 134 that is curved. The outer surface 134 is on the second radial side R2 (i.e., outer relative to the engine central axis), in this example. Although an outer surface 134 is discussed, the teachings of this disclosure may also apply to an inner platform, and thus an inner surface. Vector lines 130 show that the surface 134 is curved in both the axial direction X and the circumferential direction C. The vector lines 130 represent the mean vector of the curvature of the platform 122. In other words, the platforms 122 are twisted as a result of flowpath design, resulting in platform curvature. This platform curvature may complicate sealing the mateface gap G, and thus a coating and mateface seal are used, as described further herein.

Figure 5:
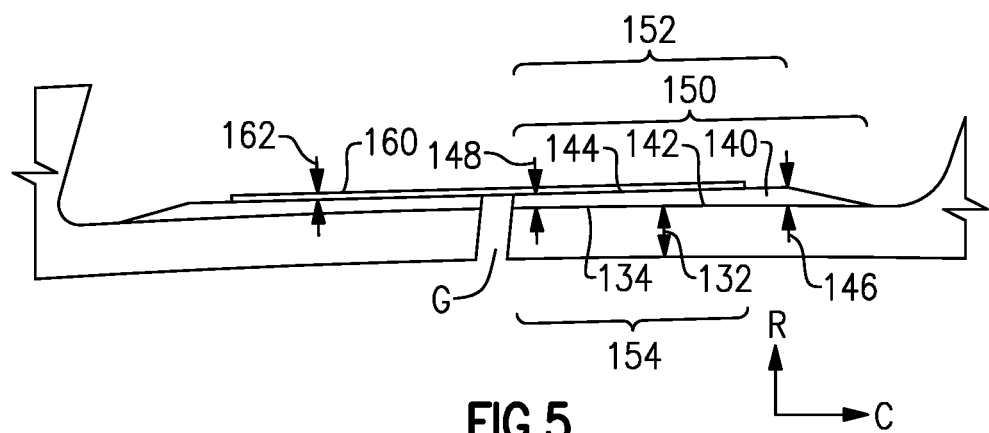
FIG. 5 schematically illustrates a cross-sectional view of a portion of the exemplary vane platform assembly.

FIG. 5 illustrates a cross-sectional view of a platform assembly having a mateface seal. The curvature of the platform 122 may impede sealing of the gap G between adjacent platforms 122A, 122B. To remove some of the curvature of the platform 122, a coating 140 is arranged on the platforms 122 between the surface 134 of the platform 122 and a mateface seal 160. The coating 140 has a first coating surface 142 flush with the platform surface 134 and a second coating surface 144 that engages the mateface seal 160. The coating 140 is machinable. In some examples, the coating 140 has a lower temperature capability than the CMC platform 122. The coating's thermal conductivity may be tailored to limit the heat transferred to the mateface seal 160 and any other sealing components within the assembly. The coating 140 may be composed of elemental silicon, silicate, silica, hafnia, zirconia, or combinations thereof, in some examples. The coating deposition technique is not particularly limited and may be, but is not limited to, spraying or painting of slurries, vapor deposition, pack cementation, and plasma spray. For example, the coating may be a plasma sprayed silicon metal.

The coating 140 is machined to have a variable thickness between the first coating surface 142 and the second coating surface 144. The coating 140 may be machined via grinding, ultrasonic machining, or milling, for example. In one example, the coating 140 has a smaller thickness 148 closer to the gap G and a larger thickness 146 further from the gap G. In other words, the smaller thickness 148 is at the circumferential sides C1, C2, while a larger thickness 146 is spaced from the circumferential sides C1, C2. The coating 140 may be machined to form the variable thickness, for example. These different thicknesses form the outer surface 144 of the coating 140. In one example, the outer surface 144 has a larger radius of curvature in the circumferential direction than the surface 134 of the platform 122 for a portion of the platform 122. The outer surface 144 of the coating 140 may be substantially flat, in some examples. In one example, the thicknesses 148, 146 of the coating 140 are less than 0.100 inches (2.54 mm). In a further example, the thicknesses 148, 146 of the coating 140 are less than 0.070 inches (1.778 mm). The thicknesses 148, 146 may be greater than 0.005 inches (0.127 mm). In a further example, the thicknesses 148, 146 may be greater than 0.020 inches (0.508 mm). In a further example, the thicknesses 148, 146 may be greater than 0.040 inches (1.016 mm). The thickness of the coating 140 may be tailored based on the curvature of the platform 122.

The mateface seal 160 is arranged on the coating and spans across the gap G between two adjacent platforms 122. The mateface seal 160 may be a metallic component such as a cobalt material, for example. The mateface seal 160 may be biased into engagement with the surface 144 of the coating 140 via a separate assembly. The mateface seal 160 may have a constant thickness 162. In some examples, the thickness 162 of the mateface seal 160 may be smaller than the coating thicknesses 148, 146. In one example, a spring assembly (shown in FIG. 7) is used to hold the mateface seal 160 in the proper location. The mateface seal 160 helps to prevent leakage of cooling air through the gap G between circumferential sides C1, C2 of adjacent platforms 122A, 122B. The leakage of cooling air may come from outboard of the platform 122, such as from a vane cavity.

Figure 6:
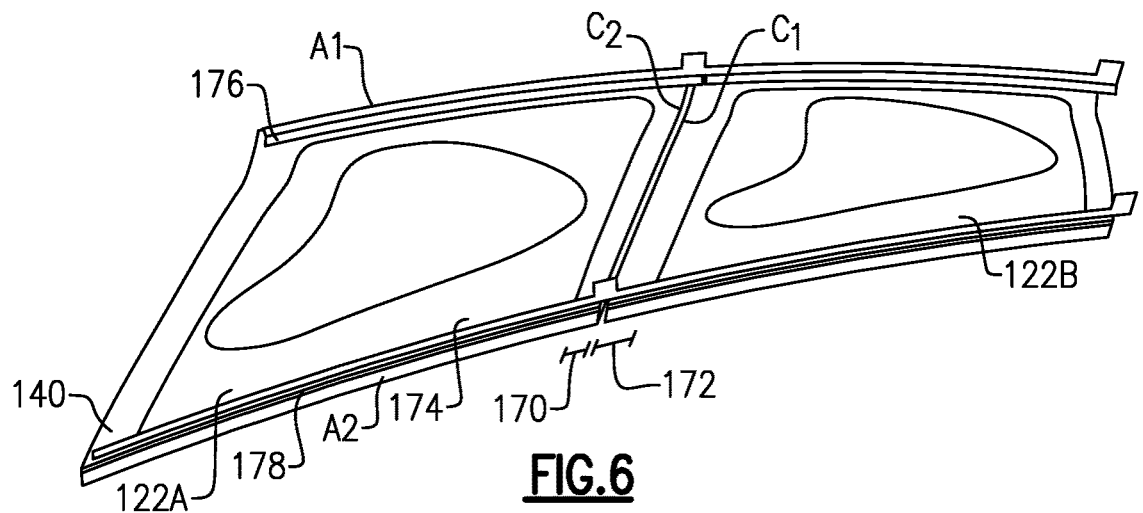
FIG. 6 schematically illustrates a view of a portion of an exemplary vane platform assembly.

FIG. 6 illustrates a portion of an example vane assembly. The coating 140 may be arranged along the circumferential and axial edges of the platforms 122A, 122B. That is, there is a portion 174 of the platform 122A, 122B that does not have the coating 140. This portion 174 allows for impingement cooling onto the platform 122A, 122B, for example. In some examples, the coating 140 has a first width 172 in the circumferential direction at the first circumferential side C1 and a second width 170 at the second circumferential side C2. The first width 172 may be larger than the second width 170, in some examples. That is, the pressure side of the airfoil platform 122 may have a smaller width 170. In some examples, the widths 170, 172 are less than about 0.250 inches (6.35 mm).

Figure 7:
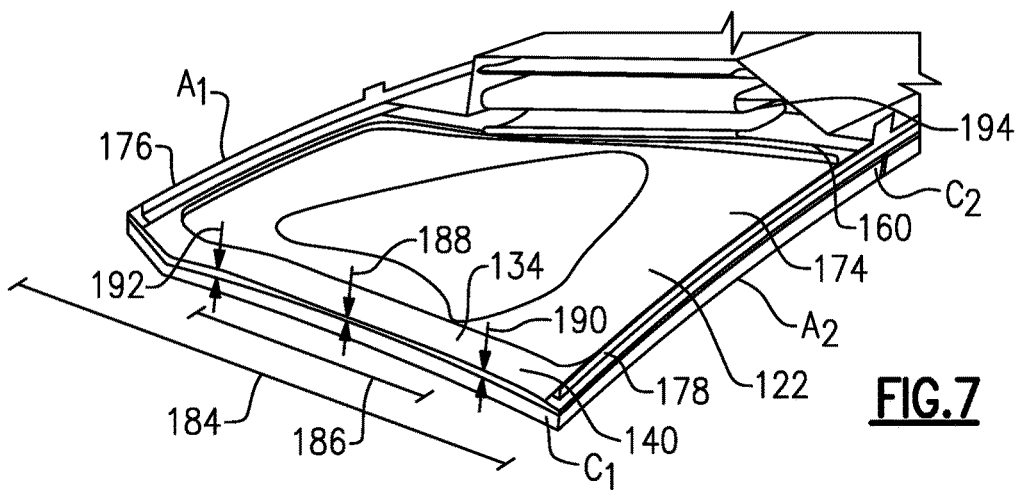
FIG. 7 schematically illustrates a view of a portion of an exemplary vane platform assembly.

FIG. 7 illustrates another view of the example vane platform assembly. The coating 140 extends from the first axial side A1 to the second axial side A2 near the circumferential edges. The coating 140 may also have a variable thickness in the axial direction. In this example, the coating has a first thickness 188 near a middle of the platform 122 in the axial direction. A second thickness 192 is forward of the first thickness 188 and a third thickness 190 is aft of the first thickness 188. The first thickness 188 may be smaller than the second and third thicknesses 192, 190. This arrangement provides the outer surface 134 of the coating with less curvature than the platform 122 in the axial direction. In one example, a portion 186 of the coating 140 is substantially flat in the axial direction X. That is, the portion 186 is substantially parallel to the engine longitudinal axis A. The portion 186 may have a length in the axial direction that is between 25% and 70% of a total length 184 of the platform 122.

In some examples, a spring assembly 194 may be used to hold the intersegment seal 160 in place at the circumferential sides of the platforms 122. Although a particular spring arrangement is shown, other spring arrangements may also be used. The coating 140, and in particular the portion 186 of the coating 140 provides a flatter surface for the spring 194 to press the intersegment seal 160 into contact with the coating 140. This may allow for better sealing effectiveness.

In some examples, the coating 140 also extends along the first and second axial sides A1, A2. In other words, the coating 140 may extend about a perimeter of the platform 122. The vane assembly may further include at least one axial seal 176, 178. A forward seal 176 and an aft seal 178 may be used at the first and second axial sides A1, A2, respectively, for sealing at the axial edges. In this example, the forward and aft seals 176, 178 are L-seals.

Figure 8:
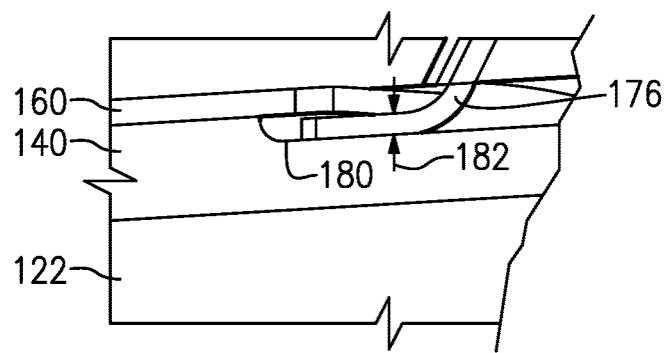
FIG. 8 schematically illustrates a cut away view of a portion of an exemplary vane platform assembly according to an embodiment.

FIG. 8 illustrates a cut away view of a portion of the vane platform assembly according to an embodiment. In this example, a portion of the coating 140 is machined away to form a step 180. The step 180 accommodates the L-seal 176. In some examples, the L-seal has a thickness 182 that is smaller than a height of the step 180. The step 180 allows a portion of the L-seal to be arranged between the coating 140 and the seal 160, while still permitting the seal 160 to be substantially flush with the coating 140. This arrangement constrains the L-seal in a radial direction, in some examples. Although the L-seal 176 is shown, a step 180 may be formed near the L-seal 178, in some examples.

Mateface seals are used to limit cooling air leakage to the core flow path, which may improve engine efficiency. However, sealing challenges may arise from high curvature in the seal land area and inherent surface roughness of CMC components. The disclosed coating arrangement removes the complex curvature of the seal land so that the mateface seal has a surface that is not highly contoured to contact. This provides for better sealing effectiveness and manufacturing. This may also allow the spring assembly to make more uniform contact with the seal. The coating may create a thermal barrier between the hot CMC platform and the seal contact surface. The disclosed arrangement also provides lower surface roughness values at the seal land, and may incorporate geometric features to enable the sealing components to work together as a system, such as a step for an L-seal. The coating thickness may also be locally tailored to provide reduced overall coating thickness and reduced radial inter-platform gap between the CMC and metallic components. The coating may further reduce the need to machine features, such as a featherseal slot, directly into the CMC platform.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A flow path component assembly, comprising:
a flow path component having a platform extending from a first circumferential side to a second circumferential side, the platform having a first radius of curvature between the first circumferential side and the second circumferential side; and
a coating arranged on a portion of the platform near the first circumferential side, the coating having a second radius of curvature, the second radius of curvature larger than the first radius of curvature, and wherein the coating is configured to support a mateface seal;
wherein the platform extends between a radially inner surface and a radially outer surface, the radially inner surface is dimensioned to bound a gas path, and the coating is disposed on the radially outer surface.

2. The flow path component assembly of claim 1, wherein the coating has a first thickness and a second thickness, the second thickness is closer to the first circumferential side than the first thickness, the second thickness is smaller than the first thickness.

3. The flow path component assembly of claim 1, wherein the coating has a thickness less than 0.100 inches (2.54 mm).

4. The flow path component assembly of claim 1, wherein the platform extends from a first axial side to a second axial side, and the coating extends from the first axial side to the second axial side.

5. The flow path component assembly of claim 4, wherein the coating has a portion between the first and second axial sides that is flat in an axial direction.

6. The flow path component assembly of claim 1, wherein the coating extends a circumferential distance from the first circumferential side of less than 0.250 inches (6.35 mm).

7. The flow path component assembly of claim 1, wherein the platform comprises a ceramic matrix composite material.

8. The flow path component assembly of claim 1, wherein the platform is a vane platform.

9. The flow path component assembly of claim 8, wherein the vane platform is an outer vane platform.

10. A flow path component assembly, comprising:
a flow path component having a platform extending from a first circumferential side to a second circumferential side, the platform having a first radius of curvature between the first circumferential side and the second circumferential side;
a coating arranged on a portion of the platform near the first circumferential side, the coating having a second radius of curvature, the second radius of curvature larger than the first radius of curvature, and wherein the coating is configured to support a mateface seal;
wherein the platform extends from a first axial side to a second axial side, and the coating extends from the first axial side to the second axial side;
wherein the coating has a portion between the first and second axial sides that is flat in an axial direction; and
wherein the portion extends between 25% and 70% of a distance between the first axial side and the second axial side.

11. The flow path component assembly of claim 10, wherein the coating has a first thickness in the portion that is smaller than an outer thickness forward or aft of the portion.

12. The flow path component assembly of claim 10, wherein the platform comprises a ceramic matrix composite material.

13. A turbine section for a gas turbine engine, comprising:
a plurality of vanes arranged circumferentially about an engine axis, each vane having a platform, and each of the platforms extend in a radial direction between a first radial side and a second radial side and extend in a circumferential direction between a first circumferential side and a second circumferential side;
wherein adjacent platforms of the plurality of vanes establish an intersegment gap between the first circumferential side and the second circumferential side of the adjacent platforms;
a coating arranged on the first radial side along the first circumferential side and the second circumferential side, the coating having a first thickness and a second thickness that is different from the first thickness; and
a mateface seal spanning across the intersegment gap such that the mateface seal sits on the coating near the first circumferential side of one of the adjacent platforms and sits on the coating near the second circumferential side of another one of the adjacent platforms.

14. The turbine section of claim 13, wherein the platform has a first radius of curvature in the circumferential direction, the coating having a second radius of curvature in the circumferential direction, and the second radius of curvature is larger than the first radius of curvature.

15. The turbine section of claim 13, wherein a spring assembly biases the mateface seal into engagement with the coating.

16. The turbine section of claim 13, wherein the mateface seal comprises a metallic material.

17. The turbine section of claim 16, wherein at least one of the adjacent platforms comprises a ceramic material.

18. The turbine section of claim 13, wherein the first radial side includes a localized region free of the coating, and the second radial side bounds a gas path of the turbine section.

19. A turbine section for a gas turbine engine, comprising:
a plurality of vanes arranged circumferentially about an engine axis, each vane having a platform, and each of the platforms have a first radial side and a second radial side and extend from a first circumferential side to a second circumferential side;
a coating arranged on the first radial side along the first circumferential side and the second circumferential side, the coating having a first thickness and a second thickness that is different from the first thickness;
a mateface seal arranged on the coating near the first circumferential side of the platform of one of the vanes and the second circumferential side of the platform of another one of the vanes; and
wherein the platform extends from a first axial side to a second axial side, and the coating extends from the first axial side to the second axial side, the coating has a portion between the first and second axial sides that is flat in an axial direction, the portion extends between 25% and 70% of a distance between the first axial side and the second axial side.

20. A turbine section for a gas turbine engine, comprising:
a plurality of vanes arranged circumferentially about an engine axis, each vane having a platform;

each of the platforms having a first radial side and a second radial side and extending from a first circumferential side to a second circumferential side;

a coating arranged on the first radial side along the first circumferential side and the second circumferential side, the coating having a first thickness and a second thickness that is different from the first thickness;

a mateface seal arranged on the coating near the first circumferential side of the platform of one of the vanes and the second circumferential side of the platform of another one of the vanes; and wherein an axial seal extends along an axial side of the platform, and a step is formed in the coating, wherein at least a portion of the axial seal is arranged between the step and the mateface seal.

* * * * *